United States Patent
Bauer et al.

(10) Patent No.: US 6,368,248 B1
(45) Date of Patent: Apr. 9, 2002

(54) METHOD AND DEVICE FOR CONTROLLING A DRIVE UNIT OF A VEHICLE

(75) Inventors: Torsten Bauer, Vaihingen; Winfried Langer, Illingen; Martin Streib, Vaihingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/598,537

(22) Filed: Jun. 21, 2000

(30) Foreign Application Priority Data

Jun. 22, 1999 (DE) .......................... 199 28 477

(51) Int. Cl.[7] .............................................. B60K 41/04
(52) U.S. Cl. ........................................................ 477/111
(58) Field of Search ................................ 477/111, 700, 477/904

(56) References Cited

U.S. PATENT DOCUMENTS

| | | | |
|---|---|---|---|
| 5,457,633 A | * | 10/1995 | Palmer et al. ......... 364/431.09 |
| 5,692,472 A | | 12/1997 | Bederna et al. |
| 5,738,606 A | * | 4/1998 | Bellinger ..................... 477/111 |
| 6,042,505 A | * | 3/2000 | Bellinger ..................... 477/111 |
| 6,135,918 A | * | 10/2000 | Bellinger et al. ........... 477/111 |

FOREIGN PATENT DOCUMENTS

| DE | 195 36 038 | 4/1997 |
|---|---|---|
| DE | 197 28 769 | 1/1999 |

OTHER PUBLICATIONS

Possible Applications and Future Opportunities for Intelligent Sensors in Motor Vehicles, 1990, Bosch Technische Berichte, vol. 52, pp. 30–41. Described in the specification.

* cited by examiner

*Primary Examiner*—Dirk Wright
(74) *Attorney, Agent, or Firm*—Kenyon & Kenyon

(57) ABSTRACT

A method and a device for controlling a drive unit of a vehicle in which the actual torque of the drive unit is compared to a specified, maximum allowable torque for monitoring purposes. When the actual torque exceeds the maximum allowable torque, the drive unit is controlled in a torque-reducing manner. The actual torque of the drive unit is determined on the basis of a signal representing vehicle acceleration. Instead of comparing absolute values, a differential comparison is carried out.

11 Claims, 2 Drawing Sheets

METHOD AND DEVICE FOR CONTROLLING A DRIVE UNIT OF A VEHICLE

BACKGROUND INFORMATION

A method and a device for controlling a drive unit of a vehicle are described in German Patent Application No. 195 36 038 (U.S. Pat. No. 5,692,472), This publication describes a method for determining a maximum allowable torque of the drive unit as a function of the accelerator position. In addition, the actual torque of the drive unit is determined from operating quantities, compared to the maximum allowable torque, and a torque-reducing intervention into the drive unit made when the actual torque exceeds the maximum allowable torque. In the preferred embodiment of an internal combustion engine, the actual torque is derived from a measured quantity for the air supply to the internal combustion engine. To achieve the object in this manner, torque increases, e.g. through idle speed control, engine losses, and measuring device tolerances, need to be taken into account for determining the allowable torque. The latter must therefore be set to a relatively large value during normal operation. Difficulties, especially with regard to actual torque determination, also arise when using the method in conjunction with direct-injection gasoline engines.

An object of the present invention is to provide features that can be used to achieve more precise monitoring. In addition, this monitoring should be independent of the respective drive engine type.

An acceleration sensor that measures vehicle acceleration is described in the publication entitled "Einsatzmöglichkeiten und Zukunftschancen intelligenter Sensoren im Kraftfahrzeug" (Possible Applications and Future Opportunities for Intelligent Sensors in Motor Vehicles), Bosch Technische Berichte, 1990, Volume 52, pages 30 to 41. A suitable evaluation of the sensor information yields a measurement signal that indicates vehicle acceleration.

A method for estimating the mass of a vehicle on the basis of vehicle acceleration and the driving power, i.e. driving torque, of the drive unit is described in German Patent Application No. 197 28 769.

SUMMARY OF THE INVENTION

To monitor drive unit control in a motor vehicle on the basis of the driving torque determined as a function of a signal representing vehicle acceleration, the monitoring function is independent of torque increases caused by operation, which can occur for example in a cold internal combustion engine or when is operating secondary units. The maximum allowable torque can be set more precisely without having to take into account sensor tolerances and operating states in which such torque increases are allowed.

Another advantage is that taking an estimated or measured vehicle mass into account when calculating driving torque from the acceleration signal increases the accuracy of the driving torque value and thus improves monitoring.

One particular advantage is that monitoring on the basis of the driving torque determined from a vehicle acceleration signal is independent of the type of drive unit, so that the monitoring function is suitable for intake manifold injection engines as well as lean-mix or stratified-charge engines, Diesel engines, and electric engines.

The use of an acceleration sensor for measuring acceleration is particularly advantageous because, compared to an acceleration measurement by wheel velocity sensors, it has the advantage that only the acceleration caused by the engine torque is measured when passing over a gradient. Thus, the measured value of the acceleration sensor remains unchanged when a gradient suddenly appears and the engine torque remains constant.

A particular advantage is that, to diagnose the acceleration sensor from the measured acceleration, an engine torque is determined which, during fault-free operation, must lie within a preset tolerance range around the setpoint torque specified by the driver. If not, a latent error has occurred, e.g. the sensor signal present is too small.

DETAILED DESCRIPTION

Figure 1:
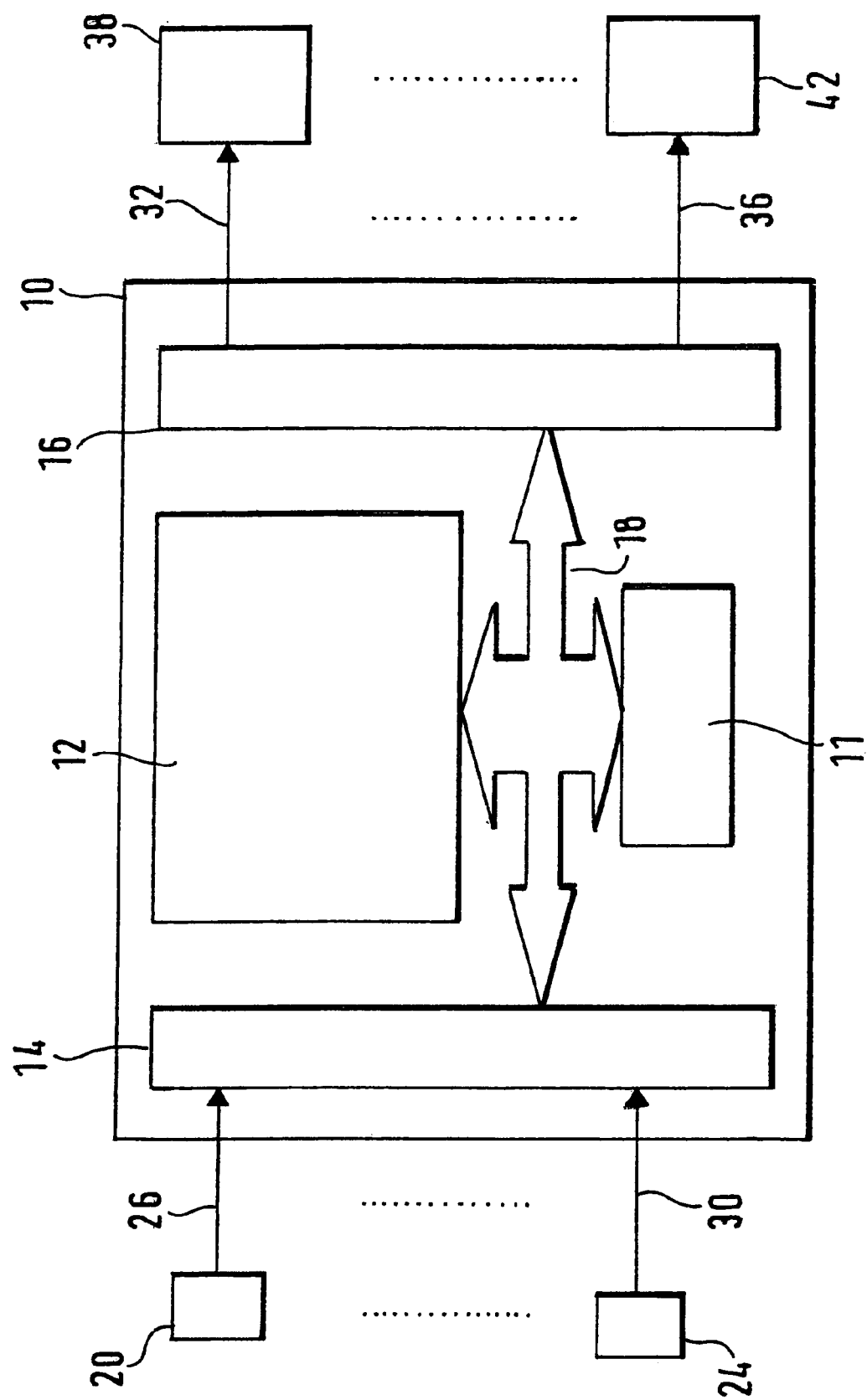
FIG. 1 shows an overview block diagram of a control unit having an arithmetic element used to control the drive unit of the vehicle.

FIG. 1 shows an electronic control unit 10 that includes at least one arithmetic element 12, a memory chip 11, an input circuit 14, and an output circuit 16. The above-mentioned elements are connected to each other via a communication system 18 for the purpose of exchanging data. Input circuit 14 receives signals that represent measured operating quantities of the drive unit, drive train and/or motor vehicle, or from which such operating quantities can be derived. These signals are detected by measuring devices 20 to 24 and are supplied to input circuit 14 via input lines 26 to 30. In addition, signals that activate control elements for setting at least one operating quantity of the drive unit, drive train and/or motor vehicle are output via output circuit 16. The corresponding control signal quantities are output to control elements 38 to 42 via lines 32 to 36.

With a view to the procedure described below, measuring devices 20 to 24 are at least measuring devices for detecting at least one wheel velocity and/or vehicle acceleration, accelerator position β, engine speed NMOT, transmission Ü in the vehicle drive train. The measuring device for detecting vehicle acceleration is a conventional acceleration sensor. In the preferred embodiment of the control arrangement in an internal combustion engine, an electrically controlled throttle valve, fuel metering devices, and ignition devices are therefore controlled as control elements 38 to 42 via output lines 32 to 36. In addition to the described input and output quantities, additional input quantities are detected and additional output quantities formed, depending on the drive unit design, as part of the drive unit control arrangement. Examples of this include engine temperature, air mass, exhaust composition, etc. or drive quantities for a turbocharger, a gear control, etc. However, these quantities are of secondary importance in relation to the control monitoring procedure described below and are therefore not described in further detail here.

Using programs running on arithmetic element 12, the latter generates values for the control quantities to be output and which activate the control elements as a function of the input signals, operating quantities derived from them, and/or internal quantities. In the preferred embodiment, a drive unit of a vehicle is controlled by detecting, in the known manner, the position of a control element operated by the driver and generating a setpoint for a drive unit torque on the basis of this position. The setpoint is then converted to a resulting setpoint for the torque, taking into account the setpoints of other control systems received via the input circuit, such as traction control, automatic transmission control, etc., as well as setpoints formed internally (limits, etc.). In the preferred embodiment of an internal combustion engine, this converted setpoint is then transformed into at least one setpoint for the position of the throttle valve, which is set in a position control loop. In Diesel engines and internal combustion engines with direct gasoline injection at least in stratified-charge mode, the main control quantity is the fuel mass to be injected, which is also set as a function of the torque setpoint. In the preferred embodiment, the torque value is the indicated torque, i.e. the torque that is generated by combustion during the high-pressure phase of the particular cylinder, but can otherwise be a different torque, e.g. the torque present at a drive shaft of the drive unit (driving torque).

In relation to the procedure described, the torque also represents performance values which, in another embodiment, form the basis for control.

To monitor drive unit control, a signal representing vehicle acceleration is used to determine the driving torque of the drive unit, i.e. the torque generated at a drive shaft of the drive unit. This is done by taking into account the vehicle mass, engine speed, and transmission in the drive train. An allowable driving torque is also determined at least on the basis of the accelerator position and engine speed. The actual driving torque is compared to the maximum allowable torque, and torque-limiting measures are carried out, e.g. limiting the throttle valve position, deactivating fuel injection, etc. when the actual driving torque exceeds the maximum allowable torque. When the actual torque drops back again below the maximum allowable torque, the torque-limiting measures end.

In the preferred embodiment, vehicle acceleration is determined by a conventional acceleration sensor. The advantage of this is that only the acceleration is measured by the engine torque when passing over a gradient.

Comparing an engine torque determined from the measured acceleration to the setpoint specified by the driver within a specific tolerance range makes it possible to diagnose the acceleration sensor. If the values differ from one another by an impermissible amount, it can be assumed that an error has occurred in the acceleration sensor. This increases the controller operating reliability.

The vehicle mass is an unknown quantity at the time the driving torque is determined. This can be taken into account in a number of different ways. For example, the maximum allowable torque is specified as a function of accelerator position and speed in such a way that, assuming a minimum vehicle mass, a maximum possible acceleration would result for this operating point upon achieving the maximum torque. In other embodiments, the vehicle mass is measured or estimated, as in the related art mentioned in the preamble, so that the determination of driving torque becomes more accurate, depending on the vehicle acceleration. The maximum allowable torque can then be specified more precisely, particularly if the determined vehicle mass is also taken into account when determining the maximum allowable torque.

Apart from comparing absolute torque values, a differential comparison is carried out in one embodiment to exclude the acceleration sensor tolerance. For this purpose, a specific maximum allowable acceleration change, i.e. actual torque change, is assigned to a specific change in the setpoint or maximum allowable driving torque at a specific time interval. Torque-reducing measures are taken if this change is exceeded.

Figure 2:
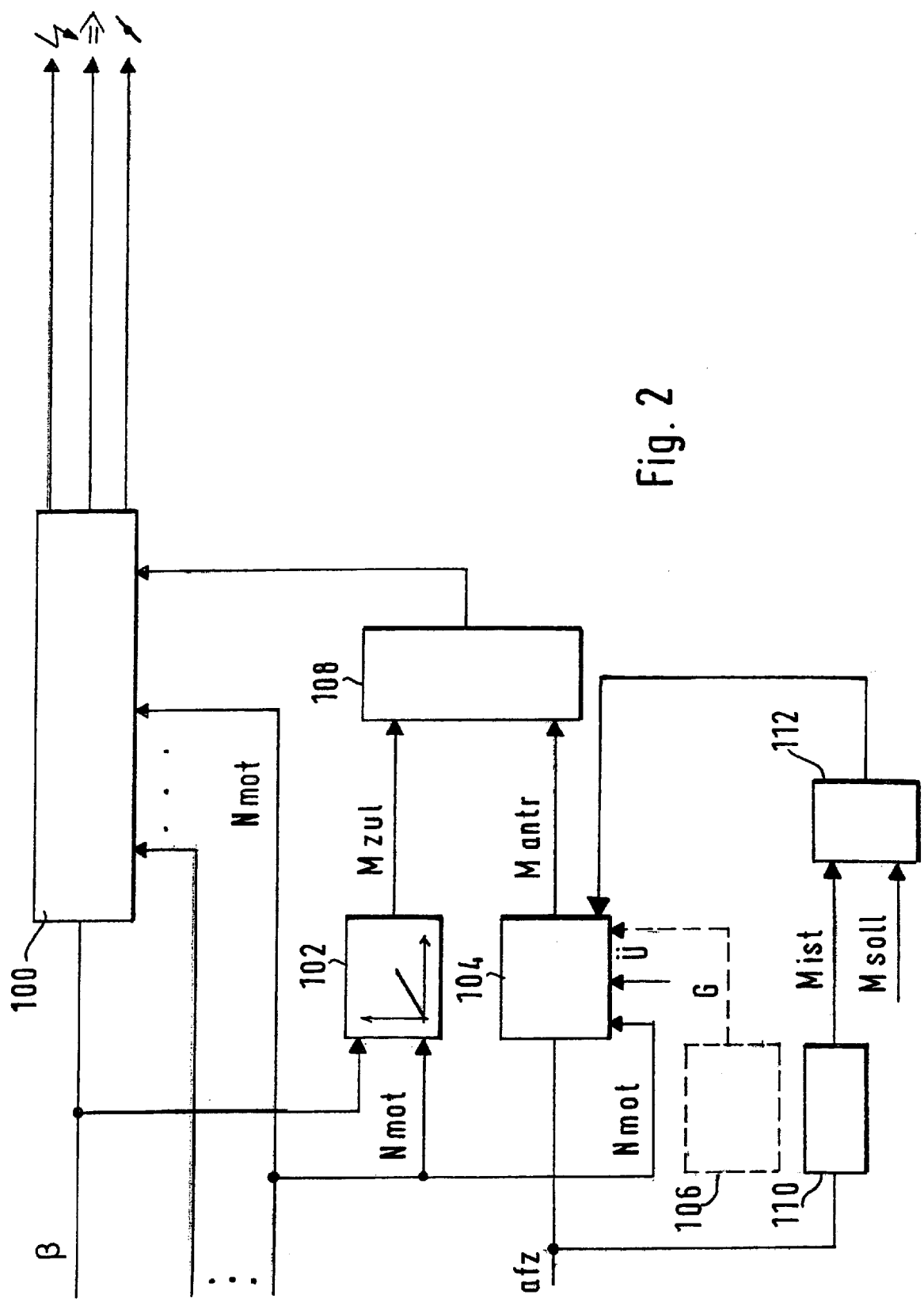
FIG. 2 shows a flowchart illustrating one embodiment for monitoring the control arrangement based on a signal for vehicle acceleration.

In the preferred embodiment, the illustrated monitoring function is implemented in the form of a program running on arithmetic element 12. The flowchart shown in FIG. 2 illustrates one example of such a program.

The drive unit control described above is combined into program 100 in FIG. 2. In this program 100, control quantities at least for setting the ignition time, fuel metering, and air supply are generated as a function of accelerator position β, engine speed NMOT, and other operating quantities and output to the corresponding control elements. Examples of controllers of this type are known and are therefore not described in any further detail here.

In addition to the accelerator position and engine speed, vehicle acceleration afz detected by an acceleration sensor and at least one wheel velocity VRAD are input. First of all, a maximum allowable driving torque MZUL is generated according to a characteristic family 102 on the basis of accelerator position β and engine speed NMOT, and possibly the vehicle mass. Actual driving torque MANTR is then generated in program 104 on the basis of measured vehicle acceleration afz, engine speed NMOT, drive train transmission Ü, and possibly estimated or measured vehicle mass G. The vehicle mass is estimated by program 106, for example in the manner known from the related art, or determined by a corresponding measuring device that measures the load of one axle.

Maximum allowable driving torque MZUL and actual driving torque MANTR are supplied to a comparator 108. Here, both quantities are compared to one another. If the actual driving torque exceeds the maximum allowable torque, engine controller 100 performs a torque-reducing intervention via the illustrated connection, causing the actual driving torque to drop back again below the maximum allowable torque. After this has taken place, the torque-reducing intervention ends and is not initiated again until the actual torque once more exceeds the maximum allowable torque.

To monitor the serviceability of the acceleration sensor, an actual torque MIST is determined on the basis of the measured acceleration (torque calculator 110). This torque is compared to the setpoint torque in comparator 112. If the two values differ from one another according to the tolerances, it is assumed that the acceleration sensor has malfunctioned, and a corresponding item of information causes the actual torque determination in 104 to be carried out on the basis of other quantities (e.g. air mass and speed).

What is claimed is:

1. A method for controlling a drive unit of a vehicle, comprising the steps of:

detecting a signal representing an acceleration of the vehicle;

determining an actual torque of the drive unit as a function of the acceleration signal;

determining a maximum allowable torque at least as a function of a quantity representing an accelerator position; and controlling the drive unit in a torque-reducing manner when the actual torque and the maximum allowable torque differ from one another by a predetermined, impermissible amount.

2. The method according to claim 1, wherein the acceleration signal is a signal of an acceleration sensor.

3. The method according to claim 1, wherein the actual torque of the drive unit is a driving torque at an output of the drive unit, and wherein the actual torque is determined from the acceleration signal as a function of an engine speed and a gear transmission.

4. The method according to claim 3, wherein the actual torque is determined as a further function of a mass of the vehicle.

5. The method according to claim 2, further comprising the steps of:
- converting the acceleration signal generated by the acceleration sensor to the actual torque; and
- comparing the actual torque to a setpoint torque specified by a driver to determine any impermissible deviations.

6. The method according to claim 5, further comprising the step of generating the actual torque on the basis of other quantities in the event of an impermissible deviation.

7. The method according to claim 4, further comprising the step of estimating the vehicle mass.

8. The method according to claim 4, further comprising the step of measuring the vehicle mass.

9. A method for controlling a drive unit of a vehicle, comprising the steps of:
- determining a setpoint torque at least as a function of a quantity representing an accelerator position;
- determining an operating quantity related to a torque;
- assigning a maximum allowable acceleration change to a setpoint torque change at a preselected time interval; and
- controlling the drive unit in a torque-reducing manner when the setpoint torque and the operating quantity differ from one another by a predetermined, impermissible amount, the controlling being performed when one of: (a) an acceleration and (b) an actual torque determined on the basis of the acceleration exceeds an allowable value.

10. The method according to claim 9, wherein the maximum allowable acceleration change is an actual torque change.

11. A device for controlling a drive unit of a vehicle, comprising:
- a control unit controlling a torque of the drive unit, the control unit including means for determining a maximum allowable torque at least as a function of an accelerator position, for generating an actual torque of the drive unit as a function of a signal representing an acceleration of the vehicle, and for controlling the drive unit in a torque-reducing manner when the actual torque exceeds the maximum allowable torque.

* * * * *